(12) United States Patent
Tong et al.

(10) Patent No.: US 9,002,333 B1
(45) Date of Patent: Apr. 7, 2015

(54) MOBILE DEVICE REPUTATION SYSTEM

(75) Inventors: Ning Tong, Nanjing (CN); Gang Chen, Nanjing (CN)

(73) Assignee: Trend Micro Inc., Tokyo (JP)

( * ) Notice: Subject to any disclaimer, the term of this patent is extended or adjusted under 35 U.S.C. 154(b) by 1678 days.

(21) Appl. No.: 12/189,580

(22) Filed: Aug. 11, 2008

(51) Int. Cl.
*H04M 3/42* (2006.01)

(52) U.S. Cl.
CPC .................................. *H04M 3/4211* (2013.01)

(58) Field of Classification Search
CPC ...................... H04M 3/42042; H04M 3/42068; H04M 3/42059
USPC .............. 455/415, 414.1, 410–411, 417, 567; 379/88.19–88.21, 142.06, 210.02
See application file for complete search history.

(56) References Cited

U.S. PATENT DOCUMENTS

| | | | |
|---|---|---|---|
| 7,359,499 B1 * | 4/2008 | Frentz et al. | 379/210.02 |
| 7,787,606 B2 * | 8/2010 | Lee | 379/210.02 |
| 8,577,002 B2 * | 11/2013 | Stein et al. | 379/142.06 |
| 2001/0016507 A1 * | 8/2001 | Karusawa | 455/575 |
| 2002/0101197 A1 * | 8/2002 | Lys et al. | 315/291 |
| 2003/0156707 A1 * | 8/2003 | Brown et al. | 379/265.06 |
| 2004/0264663 A1 * | 12/2004 | Enzmann et al. | 379/142.06 |
| 2006/0227948 A1 * | 10/2006 | Pearson et al. | 379/136 |
| 2007/0208613 A1 * | 9/2007 | Backer | 705/10 |
| 2008/0123823 A1 * | 5/2008 | Pirzada et al. | 379/88.11 |
| 2009/0052644 A1 * | 2/2009 | Wood et al. | 379/142.06 |

* cited by examiner

*Primary Examiner* — Marcos Torres
(74) *Attorney, Agent, or Firm* — Beyer Law Group LLP

(57) ABSTRACT

A reputation system aids in the prevention of unwanted spam or malicious communications from being sent to a mobile device, such as a cell phone. A collaborative process is used to determine ratings for a collection of source identifications of the communications. The source identifications are caller identifications (IDs) of a corresponding voice or SMS communication. A collection of opinions is maintained regarding the caller IDs. The reputation system then uses a method of making automatic predictions about the caller IDs by collecting caller ID information from many users to populate the database of maintained opinions. As such, caller IDs of users who have sent spam or malicious messages can be blocked by using collaborative information from many users, as opposed to relying on individual users to block unwanted communications.

14 Claims, 10 Drawing Sheets

Rating Database Record

MOBILE DEVICE REPUTATION SYSTEM

FIELD OF THE INVENTION

The present invention relates generally to mobile communication devices. More specifically, the present invention relates to the prevention of malicious or annoying communications made to a mobile device.

BACKGROUND OF THE INVENTION

Cell phone and other mobile communication devices have grown dramatically in popularity in recent years, in not just the United States but throughout the world. While an annoying phone call to a traditional phone (i.e., land-line) might be a minor inconvenience, mobile devices are portable, they are often taken into places or situations where disturbances could range from extremely annoying to completely unacceptable, such as in meetings, movie theaters, restaurants, etc.

Furthermore, many mobile communications devices accept other forms of communication than merely phone calls. For example, many mobile communications devices permit communication via text messaging. The most popular text messaging protocol is the Short Message Service (SMS) protocol. In SMS, a user may send up to 160 characters to a communications device. While SMS messages are similar to email in that text messages are transmitted, they are different in that they typically aren't transmitted via Transmission Control Protocol/Internet Protocol (TCP/IP) or similar protocols, but are instead transmitted over a mobile communications services such as Global System for Mobile communications (GSM). As such, much like a phone call, they have an origination phone number, which can be accessed in order to identify the originator of the message (such as, for example, by using caller ID).

Many annoying phone calls or SMS messages may fall under the category of "spam." Spam is generally unsolicited commercial advertising. While spam generally wastes time and can be annoying, for the most part it does not cause direct financial harm to the recipient (although the resources that spam utilizes can indirectly cost money, such as, for example, bandwidth costs rising). There are other types of communications which are more malicious. These include communications with viruses or worms, as well as so called "phishing" attacks. A phishing attack is one where the sender is posing as a legitimate sender in order to entice the recipient to respond with personal information that could then be used to steal money. For example, a phishing attack may include a communication purportedly from a bank requesting that the recipient enter his bank account information in order to correct a problem or access a service. Upon transmission of the account information, the user's bank account is cleaned out by the malicious initiator of the attack.

One way to aid in the prevention of unwanted spam or phone calls to users of a mobile device is to utilize black lists. As black list is a list that the user sets up containing a list of all phone numbers, prefix numbers, or phrases that the user wishes to block. For example, the user may elect to block all messages from a particular phone number or grouping of phone numbers. The user may also elect to block all messages from any phone number for any messages that contain a certain term or phrase.

The disadvantage of this approach is that it is a standalone approach. A user's blacklist is unique to his device or account and there is no mechanism in which to easily share this information with others.

Considering this previous approach and its disadvantages, a mobile device reputation system is desired that would be effective, simple, flexible and easy for the end user to use.

SUMMARY OF THE INVENTION

A reputation system aids in the prevention of unwanted spam or malicious communications from being sent to a mobile device, such as a cell phone. A collaborative process is used to determine ratings for a collection of source identifications of the communications. In one embodiment, the source identifications are caller identifications (IDs) of a corresponding voice or SMS communication. A collection of opinions (or ratings) is maintained regarding the caller IDs. The reputation system then uses a method of making automatic predictions about the caller IDs by collecting caller ID information from many users to populate the database of maintained opinions. As such, caller IDs of users who have sent spam or malicious messages can be blocked, but blocked by using collaborative information from many users, as opposed to relying on individual users to block unwanted communications.

In one embodiment the predictions of reputability are calculated beforehand and are available whenever a user queries the centralized reputation service with a particular caller ID. Alternatively, the raw data is stored in a database and the predictions are calculated on the fly once a request for a prediction for a particular caller ID is received at the reputation service. A user may take the initiative to provide a rating about a particular caller ID to the reputation service, or the reputation service may contact the user to provide a rating.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In an embodiment of the present invention, a reputation system is utilized to aid in the prevention of unwanted spam or malicious communications from being sent to a mobile device, such as a cell phone. A collaborative filtering algorithm is used to determine predictions for a collection of source identifications of the communications. In one embodiment, the source identifications are caller identifications (IDs) of a corresponding voice or SMS communication. A collection of opinions is maintained regarding the caller IDs. The reputation system then uses a method of making automatic predictions about the caller IDs by collecting caller ID information from many users to populate the database of maintained opinions. As such, caller IDs of users who have sent spam or malicious messages can be blocked, but blocked by using collaborative information from many users, as opposed to relying on individual users to block unwanted communications.

It should be noted that this document will concentrate on the use of caller IDs as a mechanism to determine source identifications of mobile device communications. However, embodiments are foreseen wherein the source identifications are determined via some other mechanism. As such, one of ordinary skill in the art will recognize that the use of the term "caller ID" in this document should not be interpreted to mean that only embodiments utilizing caller ID information are possible. For example, in embodiments where the communication originates from a computer network device, an Internet Protocol (IP) address may be substituted for the caller ID.

The mobile device reputation system provides a new way to deal with security problems with cell phone users. These security problems include malicious SMS messages, malicious cell phone calls, and SMS spam messages and unwanted text messages in general. By using information regarding malicious or annoying communications in a collaborative manner, a system is provided that works more efficiently than prior art techniques.

System Diagram

Figure 1:
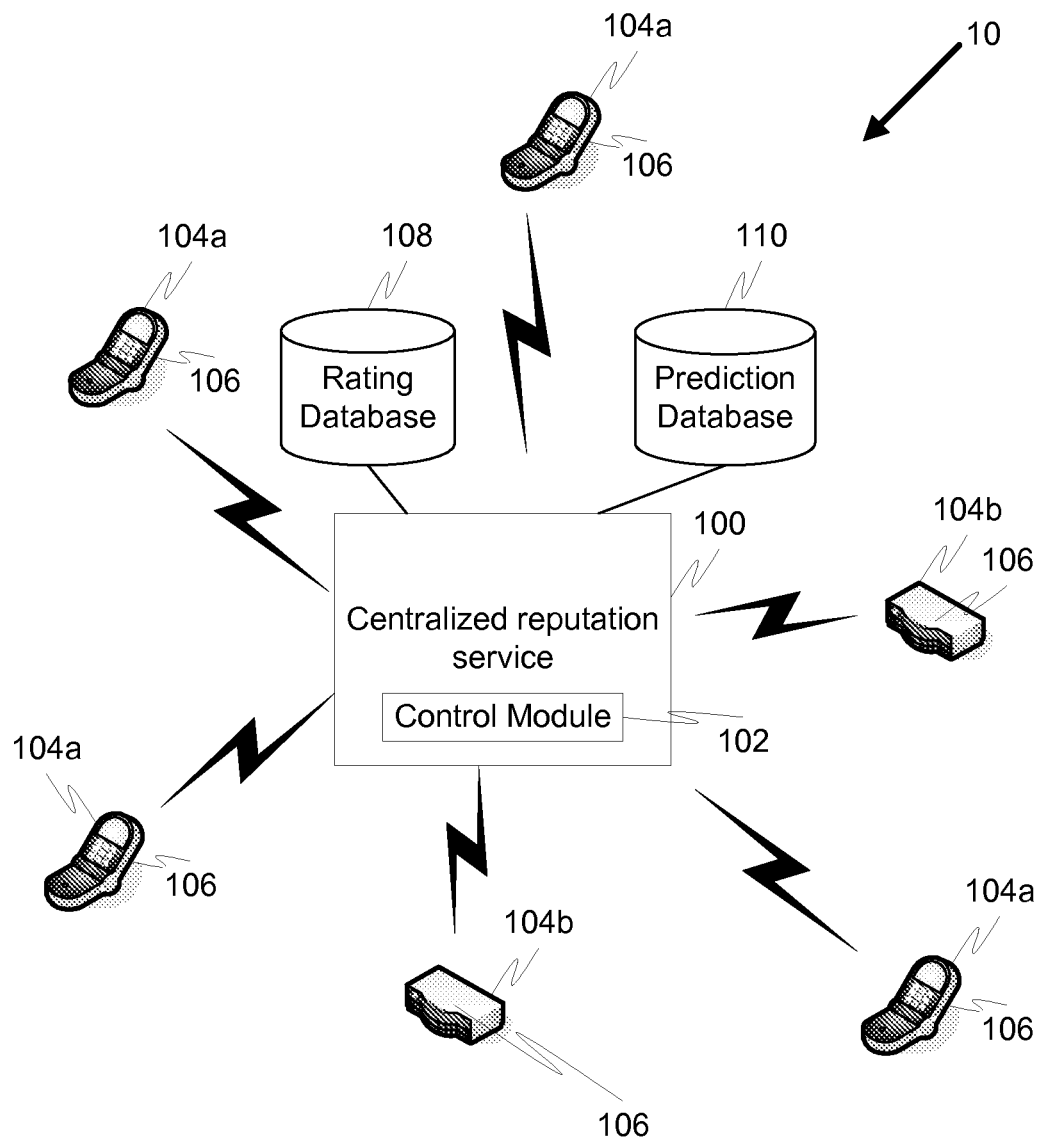
FIG. 1 is a diagram illustrating a caller ID reputation system in accordance with an embodiment of the present invention.

FIG. 1 is a diagram illustrating a mobile device reputation system 10 in accordance with an embodiment of the present invention. A centralized reputation service 100 is provided that gathers and distributes information regarding the various caller IDs. Included within service 100 is software module 102 that exercises control over the computers and servers used to host the service. It should be noted by "centralized", it is meant that the service 100 is located so that it can communicate with multiple end-user devices. In a network, there are many different levels of centralization, and the service 100 can be located at any one of those levels. For example, the service 100 may be located at a cell phone hub or node that only covers a few user devices. Alternatively, the service 100 may be located at a service provider's central location where millions of user devices are monitored. Of course, the service 100 can also be located at any point in between as well. Service 100 and control module 102 may be implemented on, for example, a caller ID gateway, a mainframe computer, a typical server computer, a plurality of computers, etc.

Multiple end user devices 104a, 104b interface with the service 100. Each participating end user device contains an agent software module 106 that collects information from the user. This will be referred to as rating information. This information is then shared with the reputation service 100, which collects the rating information from participating users and stores the rating in a rating database 108. It then creates a prediction based on the rating, which it stores in prediction database 110. This prediction is an indication of the likelihood that the sender of a communication is malicious or otherwise untrustworthy.

The rating and prediction database 108, 110, can be implemented in many different ways. For example, in one embodiment they are a single database while in another embodiment they are separate. In another embodiment, one or both of the databases are located on the same physical device as the centralized reputation service 100, while in other embodiments the database(s) may be located in different physical devices.

It should be noted that the end user devices 104a may be any mobile devices that receive communications. These include cell phones, smart phones, mobile telephones, and personal digital assistants (PDAs), but need not be limited to these embodiments. End user devices 104b are gateway devices or other similar intermediary devices operable to send and/or receive mobile communications.

When a new communication is received at the end user device, it queries a prediction from the reputation service 100 by sending the caller ID of the new communication. The reputation service 100 then retrieves the corresponding prediction from the prediction database 110 and responds to the end user device with the prediction.

The communication in question may be any communication received by the mobile device. The exact form of the communication will vary based on the type of mobile device in question and the type of software operating on the mobile device. Example communications include, but are not limited to, Global System for Mobile communications GSM, Code Division Multiple Access CDMA, Time Division Multiple Access (TDMA), Wideband Code Division Multiple Access W-CDMA, and CDMA Evolution-Data/Voice CDMA2000 EV-DO cellular phone calls, and Short Message Service (SMS) text messages.

Since the architecture is made up of multiple components, the novel processes executed may be performed on different components. As such, the process will be described from two different perspectives: the perspective from the centralized reputation service and the perspective from the end user device.

Centralized System Process

As described above, the centralized reputation service may be located in many different possible locations. Wherever the system is located however, it should have the ability to interface with the end user devices in order to gather and distribute information regarding the reputations of the sources of communications.

While there may be many different embodiments for execution of the centralized service processes, two will be presented in this section. In the first, prediction bases are computed on the ratings and stored in a database as the ratings are received. In the second, the ratings (i.e., raw data) are simply stored in the database and the prediction bases are not computed until a query for a prediction is received from an end user device.

Figure 2A:
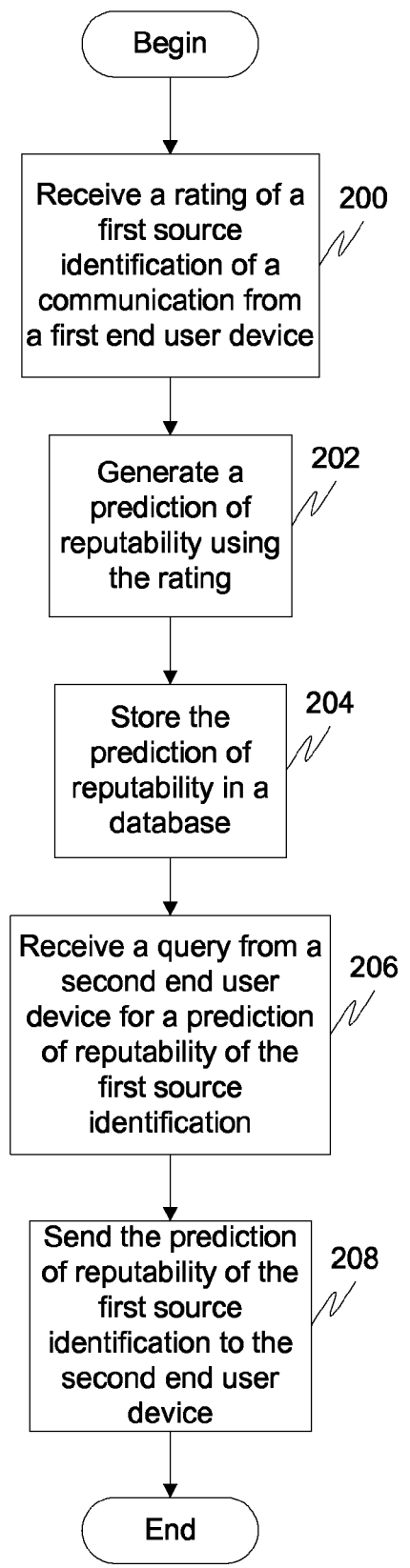
FIG. 2A is a flow diagram illustrating a method of managing a centralized reputation service in accordance with a first embodiment of the present invention.

FIG. 2A is a flow diagram illustrating a method of managing a centralized reputation service in accordance with an embodiment of the present invention. At 200, a rating of a first source identification of a communication is received from a first end user device. Of course, it is contemplated that many thousands (or more) of ratings will be received for a particular caller ID. It is also contemplated that there will be many caller IDs each receiving thousands of ratings. In one embodiment, the ratings for a particular caller ID may be stored in a database record such as shown in FIG. 4B.

At 202, a prediction of reputability is generated using the rating. It is contemplated that each caller ID will have many ratings from many users. Using the ratings of FIG. 4B as an example, the prediction of reputability may be calculated by taking an average of the individual ratings, taking the mean, using a standard deviation, using the highest ratings received, using the lowest ratings received, etc. If the ratings received are a simple "up or down," then the prediction may be determined by choosing the most popular rating, by choosing a positive rating if its percentage of the total is greater than a certain threshold, etc. If the ratings from users are received using symbols, colors, images etc., then these ratings media be converted into numerical values before the prediction is calculated.

Figure 2B:
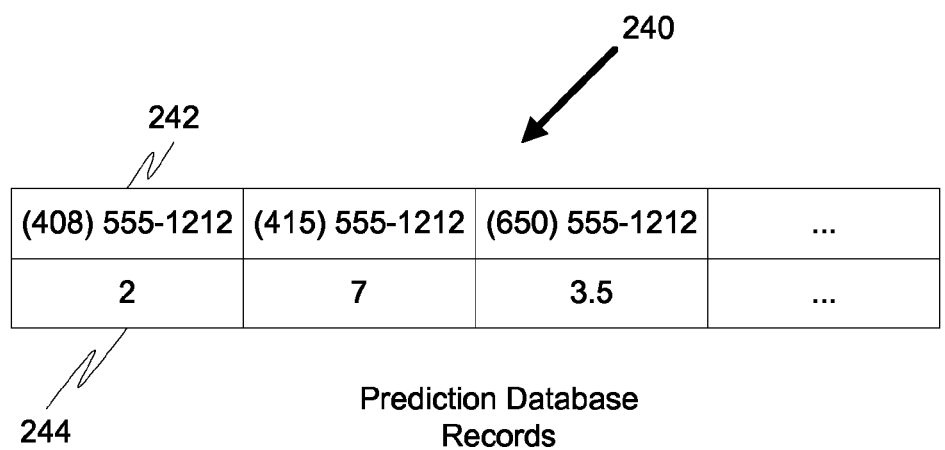
FIG. 2B illustrates example database records from prediction database 110.

In another embodiment, a collaborative filtering algorithm is used to generate a prediction from the ratings. The following is an example algorithm for prediction calculation:
BEGIN
Set id=[The caller ID we want to compute its reputation predication for];
Set ratings=[select*from rating_database where caller_id=id]
Set rating_count=number_of_the_data_record_of(ratings);
Set rating_sum=0;
For each data_record in ratings
rating_sum+=single_rating_of (data_record);
End each
Set predication_of_id=rating_sum/rating_count;
Update predication_database set predication=predication_of_id where caller_id=id;
END FIG. 2B illustrates example database records from prediction database 110. In this simple example, row 242 holds individual caller IDs while row 244 holds the corresponding prediction of reputability for the above caller ID. Control module 102 preferably generates these predictions.

At 204, the prediction of reputability is stored in the database. Table 1 is an example database structure of a user rating database. Included are fields for caller ID and rating. Additionally, a comment field can be provided to show extra information to users, such as category. Furthermore, a rating caller ID field can be provided to defeat reputation cheating. The rating caller ID is the caller ID of the mobile user who submits his personal rating to the reputation service. If there is no such ID recorded in backend database, the user rating can be computed anonymously, so a malicious user could affect the rating of curtain IDs by submitting positive rating feedbacks repeatedly, even from same mobile device. With the rating caller ID, the rating service can limit the number of user rating from a single mobile user toward a particular caller ID; user ratings exceeding the number limitation will be ignored by the system, so it will raise the bar for reputation cheating.

TABLE 1

Database structure of User Rating Database

| Caller ID | Rating | Comments/Category (Optional, if we want to show extra info to users) | Rating Caller ID (Optional, if we want to defeat reputation cheating) |
|---|---|---|---|
| (408) 123-4567 | 5 | ... | (555)456-1233 |
| (408) 123-4567 | 3 | ... | (231)435-2323 |
| (408) 123-4567 | 7 | ... | (565)567-3454 |
| ... | ... | ... | ... |
| (233) 993-4777 | 5 | ... | (555)456-1233 |

Table 2 is an example database structure of a Caller ID Prediction database. Included are fields for caller ID and rating. Additionally, a comment field can be provided to show extra information to users, such as category.

TABLE 2

Database structure of Caller ID Predication Database

| Caller ID | Rating | Comments/Category (Optional, if we want to show extra info to users) |
|---|---|---|
| (408) 123-4567 | 4 | ... |
| (232) 232-1232 | 3 | ... |
| ... | ... | ... |
| (233) 993-4777 | 5 | ... |

At 206, a query is received from a second end user device for a prediction of reputability of the first source identification (i.e., for a particular caller ID). At 208, the prediction of reputability of the first source identification is sent to the second end user device. Preferably, this step is accomplished by indexing into prediction database 110 using one of the caller IDs from row 242, and then using the corresponding numerical prediction. The prediction is sent to the second user device over the connection by which the second user device has established communication with the centralized reputation service.

Figure 3:
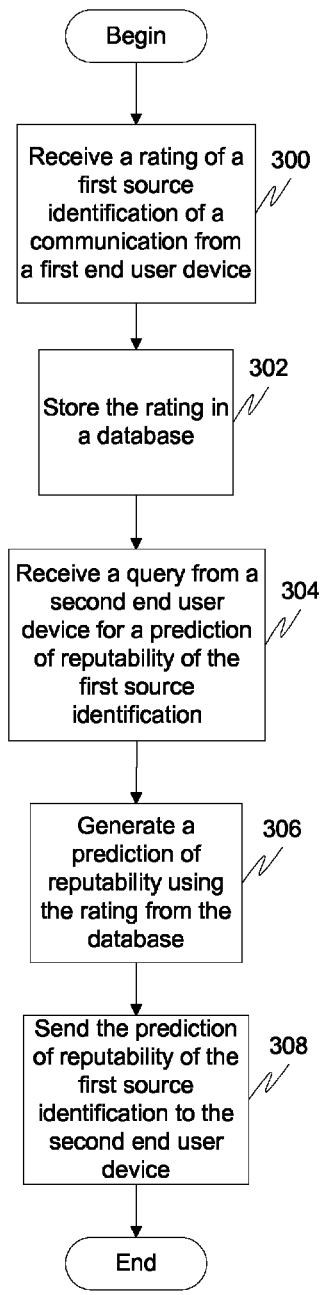
FIG. 3 is a flow diagram illustrating a method of managing a centralized reputation service in accordance with a second embodiment of the present invention.

FIG. 3 is a flow diagram illustrating a method of managing a centralized reputation service in accordance with another embodiment of the present invention. At 300, a rating of a first source identification of a communication is received from a first end user device. At 302, the rating is stored in a database. Of course, it is contemplated that many ratings will be received for a particular caller ID and that many caller IDs will receive ratings from many users.

At 304, a query is received from a second end user device for a prediction of reputability of the first source identification. At 306, a prediction of reputability is generated using the rating information from the database. At 308, the prediction of reputability of the first source identification is sent to the second end user device. Steps 306 and 308 may be performed as described above with reference to FIGS. 4B and 2B. In this embodiment of FIG. 3 a prediction of reputability is generated on the fly once a query from a user for a prediction is received. Once the prediction has been sent to the second user device, his prediction may also be stored in prediction database 110.

End User Device Process

While there may be many different embodiments for execution of end user device processes, two will be presented in this section. These two embodiments reflect two different points in time in the operation of the end user device. The first point in time is the time when a rating is generated by the end user device and sent to the centralized reputation service. In the terminology of a learning system, this is the "training" or "learning" time. The second point in time is when a new communication is received and the end-user device needs to determine whether to allow or reject the communication. This is the "execution" or "run" time.

Figure 4A:
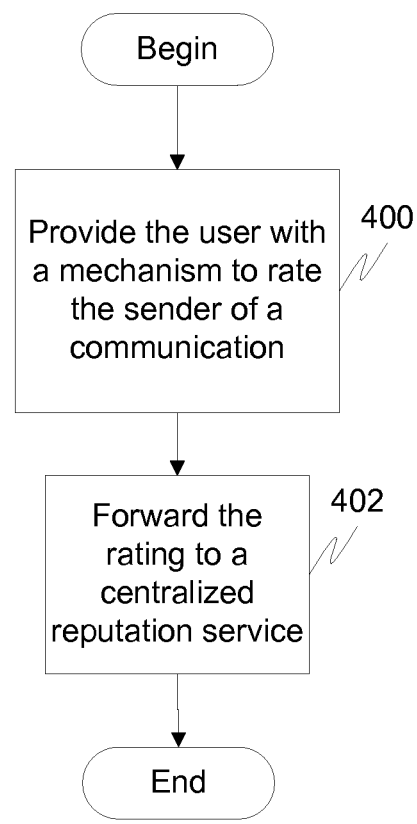
FIG. 4A is a flow diagram illustrating a method of operating an end user device in accordance with the first embodiment of the present invention.
Figure 4B:
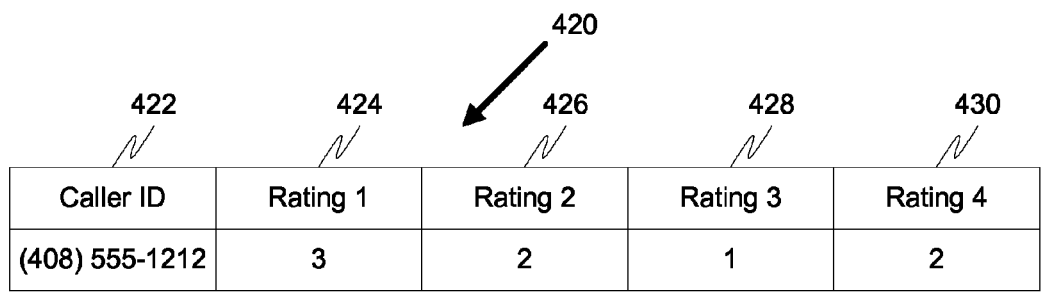
FIG. 4B illustrates an example record from rating database 108 shall in one possible implementation for storing ratings for a particular caller ID.

FIG. 4A is a flow diagram illustrating a method of operating an end user device in accordance with an embodiment of the present invention. The precise event that triggers execution of this method may vary greatly from implementation to implementation. For example, in one embodiment, a user can elect to, on his own, enter ratings for one or more source identifications. For example, the user may have a priori knowledge that certain caller IDs represent disreputable sources, such as from previous bad experiences from such callers. The user can, for example, bring up a menu that allows him to enter the caller ID and the rating of that caller ID. In an alternative embodiment, the process is executed when a user finishes a communications session. For example, as will be described in more detail later with respect to FIG. 5, if a caller ID is determined to be reputable, a communications session such as a phone call or text message session may be allowed to be established with the caller ID. At the conclusion of the session, the user is presented with a menu allowing him to enter a rating for the caller or other source of the communication. If, for example, the communication was malicious or spam, the user may enter a negative rating.

For example, once a call has been terminated (or once a text message has been received) software module 106 retains the caller ID of the source of that communication. The user then formulates a rating for that caller ID (e.g., thumbs up or down, a numerical rating, etc.) and communicates that rating for that caller ID to the centralized reputation service using the mobile telecommunications network or a local Internet connection such as WiFi.

The user himself can also be the triggering event for the rating of caller IDs. For example, the user could, upon setting up a new phone, input or import a set of caller ID ratings.

At 400, the user is provided with a mechanism to rate the sender of a communication. The rating can take many forms. In a simple embodiment, the user may simply rate the sender as being reputable or not (e.g., thumbs-up vs. thumbs-down, red-light/green-light, or yes/no). In a more complicated embodiment, the user may provide a more quantitative rating as to the level of reputability (e.g., 1 through 10 with 1 being completely reputable and 10 being completely disreputable, color codes with colors closer to green indicating more reputable and colors closer to red indicating less reputable).

The mechanism provided to rate the sender of a communication may also take many forms. In a simple embodiment, a text prompt may be provided asking the user to rate a caller ID (or enter a caller ID to rate). More complex embodiments may include graphics, sounds, or other user interface elements in lieu of or in combination with text prompts.

As mentioned above, the user may take the initiative to communicate this rating and caller ID to the reputation service by dialing a particular number and pressing keys, by sending a text message to the reputation service, by accessing a Web site of the reputation service using a WiFi connection or using a 3G protocol, etc. Software module 106 is involved in that communication by automatically contacting the reputation service or by assisting by providing the caller ID.

Alternatively, the reputation service may provide a mechanism for receiving a rating absent a user initiative. For example, module 106 prompts the user to provide a rating for a particular caller ID once the call has been terminated (or once a text message has been received). Or, after a call has been terminated (or a text message received), the reputation service dials the user's telephone and prompts the user to provide a rating. Or, the reputation service (in conjunction with the telecommunications provider) sends the user an e-mail message (or other contact) inviting the user to visit a Web site managed by the centralized reputation service that accepts ratings for calls and messages that have been sent to the user's telephone over the past month, for example.

At 402, the rating is forwarded to a centralized reputation service over a network. This rating may be created at user initiative or requested by the reputation service as described immediately above.

FIG. 4B illustrates an example record from rating database 108 shall in one possible implementation for storing ratings for a particular caller ID. Column 422 holds the particular caller ID that is being rated (without a country code in this example). Columns 424-430 hold numerical ratings that have been provided by any number of distinct users (in this example, for users). Typically, the users will provide their ratings as described above over a period of time as the individual or entity associated with caller ID 422 makes calls or sends text messages to these distinct users. It is possible that a single user may provide more than one rating. It is contemplated that on the order of hundreds or thousands of users will be providing a rating for a single caller ID.

Figure 5:
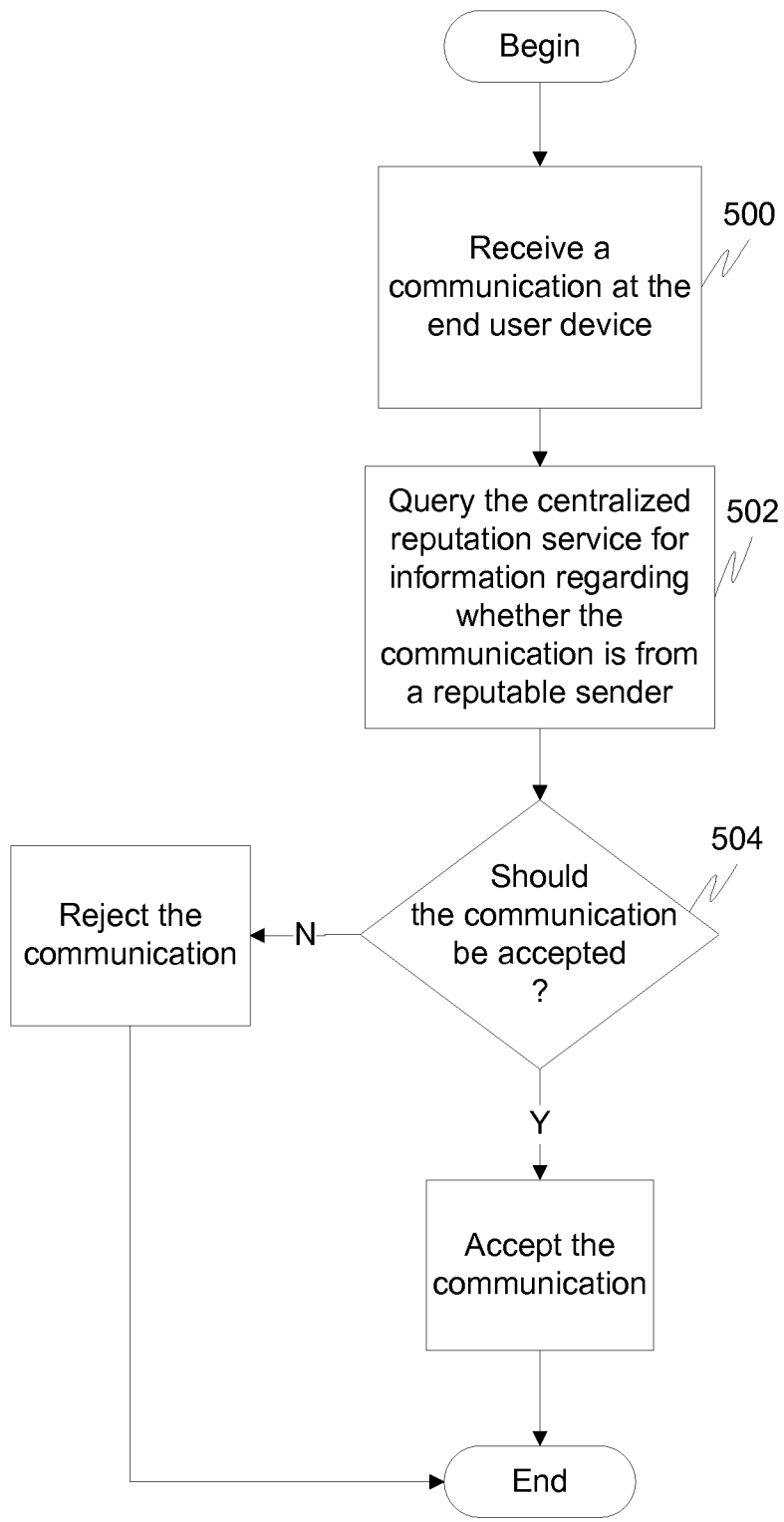
FIG. 5 is a flow diagram illustrating a method of operating an end user device in accordance with the second embodiment of the present invention.

FIG. 5 is a flow diagram illustrating a method of operating an end user device in accordance with an embodiment of the present invention. This flow diagram represents steps that can be executed at "run" time, namely when a communication is received and a determination needs to be made as to whether to accept it. For example, this method may be run when a phone call is received and the end user device needs to determine whether to permit the call to go through. As will be made clear from the description below, software module 106 of the end-user device handles execution of these steps.

At 500, the end user device receives a communication. As described above, a communication is typically a telephone call, voice communication, SMS message, text message or similar. As is known in the art, the source telephone number of that communication may be determined using any suitable caller identification service, or simply by the end-user device receiving the call and identifying the source. In any case, the source telephone number (including country code, city code, area code and telephone number) is identified by the end-user device and is referred to herein as a "caller identification" or simply a "caller ID." The caller ID may simply be the telephone number or may also include the other prefixes if necessary for a unique identification.

At 502, the device queries the centralized reputation service for information regarding whether the communication is from a reputable sender. The end-user device queries the reputation service by immediately transmitting the caller ID to the reputation service. Preferably, the caller ID is transmitted in real time as soon as the incoming call is received and while the end-user device is ringing, waiting for the user to answer the call. If the communication is a text message then transmitting the caller ID in real time and receiving information back in real time is not strictly required. Assuming the communication is a voice communication, connection to the centralized reputation service in real time may be made over the Internet via a local WiFi or WiMax signal (or other suitable local Internet data communications protocol). Alternatively, the mobile communications network (such as a cellular telephone network) over which the end-user device normally communicates voice may be used by the end-user device to connect to the centralized reputation service. For example, the EDGE network from AT&T over which mobile telephones access the Internet may be used. Or, any suitable so-called "3G" (third-generation) protocol may be used to access the Internet (and thus the reputation service) over the mobile communications network used by the end-user device.

Once the reputation service is accessed, the caller ID is transmitted. The reputation service, under control of control module 102, then begins to determine what information, rating or prediction should be transmitted back to the end-user device in real time based upon the received caller ID.

This information may take many forms. In one embodiment, the information is a recommendation made by the centralized reputation service as to whether the communication is from a reputable sender (e.g., thumbs-up or thumbs-down). In another embodiment, the information is a rating assigned to the sender of the communication that indicates the level of the sender's reputability (e.g., 1 to 10 with 1 being most reputable and 10 being least reputable). The information is based on prior collection of rating information from multiple users. The form the information takes varies greatly with the level of decision-making authority to be granted to the user of the end-user device. In some implementations, a service provider or administrator may wish to provide little or no authority to the user to decide whether or not to accept the communication. In such cases, it is more likely that the information received from the centralized reputation service may simply be a binary answer (e.g., thumbs-up or thumbs down, yes or no, etc.). In other implementations, the service provider or administrator may wish to allow the user to make his own decision as to whether to allow the communication. In such implementations, it is more likely that the information received from the centralized reputation service may be simply rating information retrieved from the database, or may be a rating along with a recommendation that the user can elect to abide by or not.

Once the information, rating or prediction is determined by the centralized reputation service this information is transmitted back to the end-user device in real time using the same connection previously established with the end-user device. Whether the information is a simple "yes or no" or a numerical rating, this information is essentially a prediction of reputability based upon analysis performed by the centralized reputation service under control of control module 102.

At 504, a decision is made to accept or reject the communication based on the information. The information is received from the reputation service and the decision is made by agent 106 of the end-user device.

In the embodiment where the information is simply a "thumbs-up or thumbs down," and is a "thumbs-up," the software agent will accept the communication (typically by taking no action) and the user will be allowed to answer the call or review the text message. The analysis of the caller ID and acceptance of the communication may be entirely transparent to the user who answers the call as normal. Alternatively, agent 106 may direct that any suitable signal, message, symbol or alert may be triggered informing the user that the incoming caller ID has been determined to be reputable. For example, the user may be alerted that the incoming call is reputable by: using a particular ring tone, emitting a particular sound or voice message from the telephone, vibrating the telephone in a particular fashion, displaying a message or symbol on the display of the telephone, flashing a light, etc.

If information is a "thumbs down" then software agent 106 takes steps to reject the incoming call or text message. For example, agent 106 terminates the incoming call so it appears to the user that the distant caller has hung up. In the case of a text message, agent 106 may cause that message not to be displayed on the end-user device in the first place. Or, if it is determined that the message is disreputable in the course of displaying the message then display of the partial message is terminated. Further, the user may be alerted that the incoming call or message is to disreputable using any of the alerts described above.

In the embodiment where the information is a rating indicating the sender's reputability (e.g., a numeral from 1 to 10), the software agent 106 may automatically make the determination to accept or reject the call based upon the incoming rating and a predetermined threshold. For example, the user is allowed to set a predetermined rating threshold on the end-user device. Alternatively, this rating threshold may be set (and not allowed to be changed) by the telephone manufacturer, by the telephone service provider, or even by the company for whom the user works. For example, if a rating threshold of "3" is set, then communications having a rating of 1-3 will automatically be accepted while communications having a rating of 4-10 will automatically be rejected. As above, the user may be alerted that the call has been accepted or rejected using any of the alerts described above.

Figure 6:
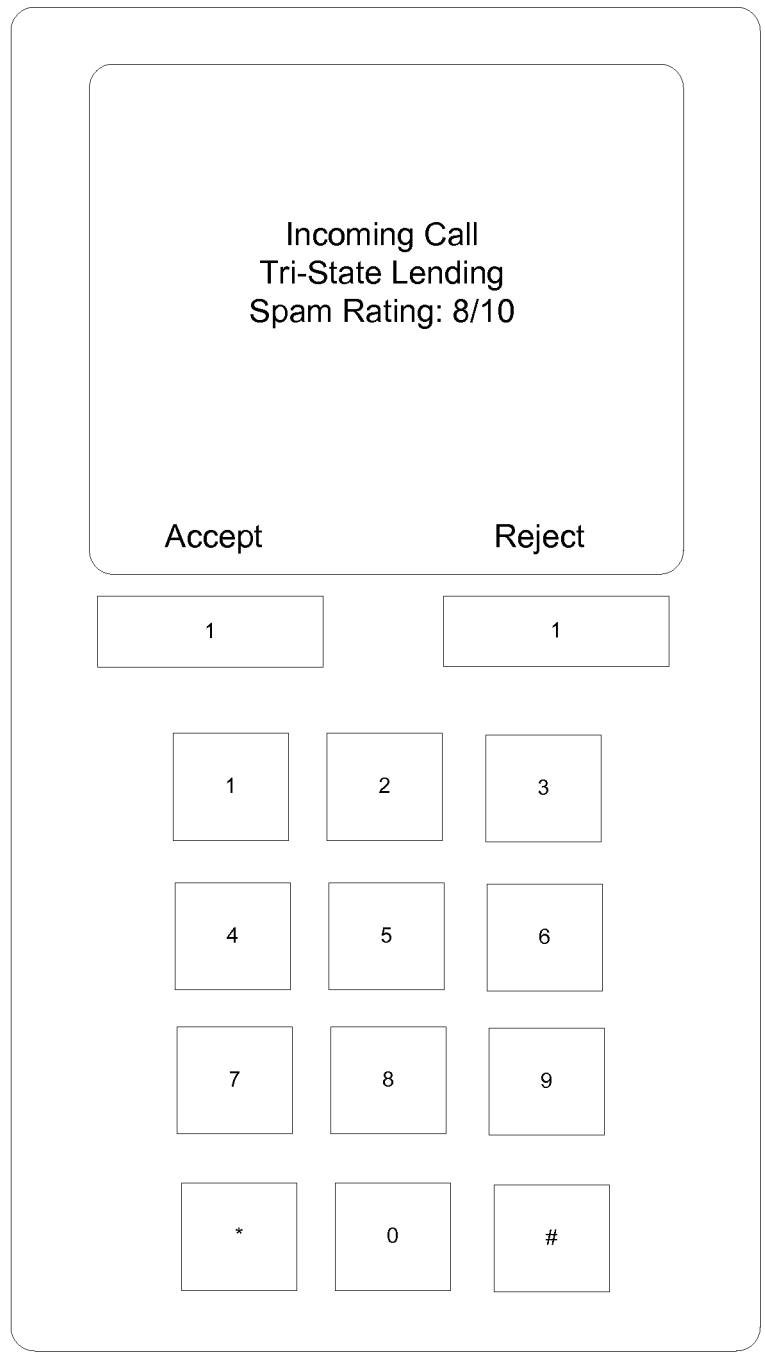
FIG. 6 is a diagram illustrating an example screen shot of how the rating may be presented to the user.

In embodiments where it is desirable to allow the user to have some input as to whether to allow the call, at this point the system may prompt the user for such input. For example, the system may display to the user an identification of the caller ID of the incoming communication along with a rating. The rating allows the user to determine on his own whether to accept the call. A prompt may also be provided permitting the user to accept or reject the call. FIG. 6 is a diagram illustrating an example screen of how the prediction may be presented to the user in accordance with an embodiment of the present invention. Of course, the precise graphics or text presented in order to provide the user with this information can vary greatly, from numeric ratings, thumbs-up or thumbs-down, color coding (e.g., red for communications from suspicious caller IDs, green for communications from safe caller IDs, gray for unknown), etc.

Even if the user has input as to whether to allow the call, agent 106 may display a "thumbs-up or thumbs down" if that is the embodiment used by the reputation service. As described above, any suitable alert may also be used in conjunction with providing the user with a recommendation.

The end-user device may perform these requests for ratings or predictions in real time via a cellular or other mobile communications network. In alternative embodiments, the mobile device may act to perform the query via a different network. For example, a cell phone may be equipped with a WiFi adapter (e.g., 802.11g) and the cell phone may act to perform such queries over the WiFi network (if one is available) as opposed to the cellular network.

Implementations are also foreseen wherein the information regarding the reputability of the sender of the communications is sent from the centralized reputation service to the end user device at other times than just in response to a query upon receipt of an incoming call. For example, it is conceivable that the centralized reputation service may send a list of "banned" caller IDs to the end user device periodically, allowing the end user device to scan this list without requiring communication with the centralized reputation service at the time a call is received. This embodiment may be modified by having the end user device only query the centralized reputation service if the caller ID of the incoming communication is not on the locally stored "banned" list. While the system may be designed to permit real-time queries from the end-user device to determine whether or not the caller ID is reputable, such communications, especially when undertaken system wide by many users, can act to clog available bandwidth or resources. As such, this modified embodiment helps reduce the amount of network traffic directed to such queries.

The banned list of caller IDs may be stored in memory 712 of the end-user device. Agent 106 operates to compare the incoming caller ID to the banned list when this embodiment is used. The banned list may be sent to the end-user device using a local Internet connection or via a suitable data protocol over the mobile telecommunications network.

Computer System Embodiment

Figure 7A:
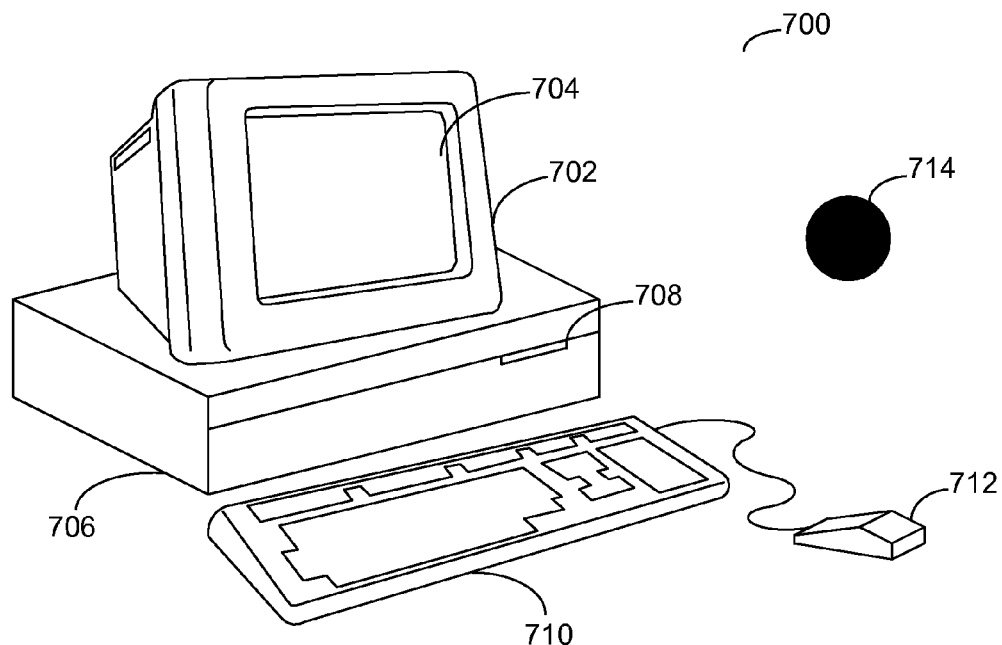
FIGS. 7A and 7B illustrate a computer system suitable for implementing embodiments of the present invention.
Figure 7B:
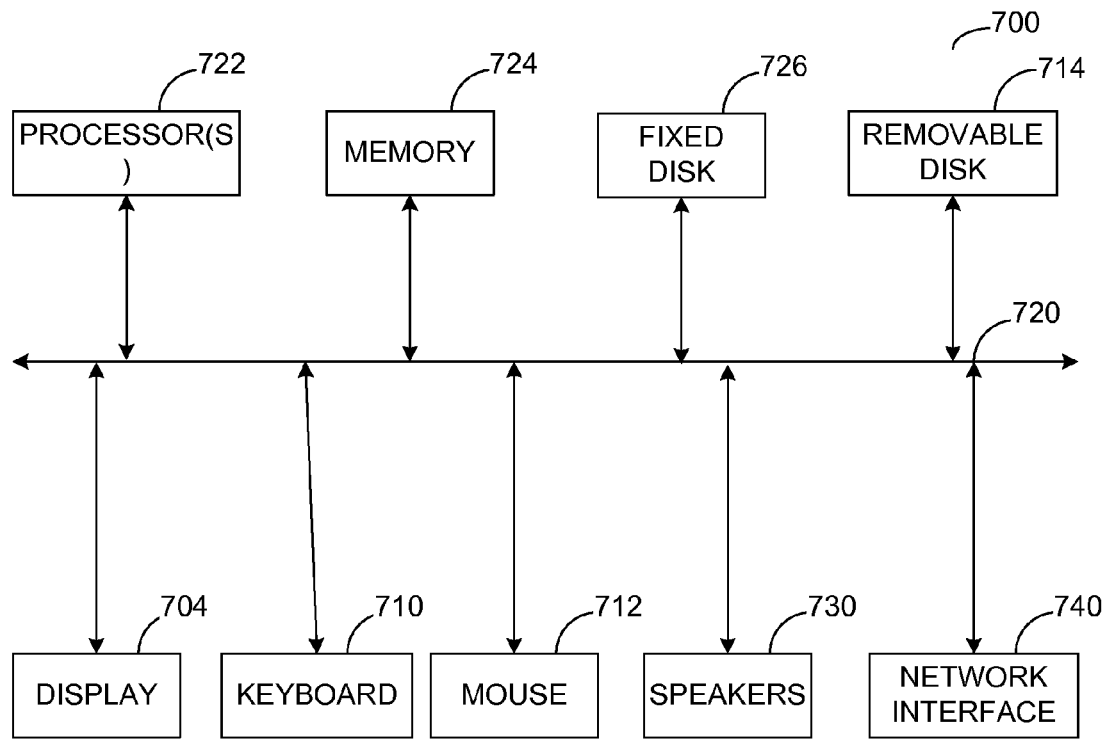
Figure 8:
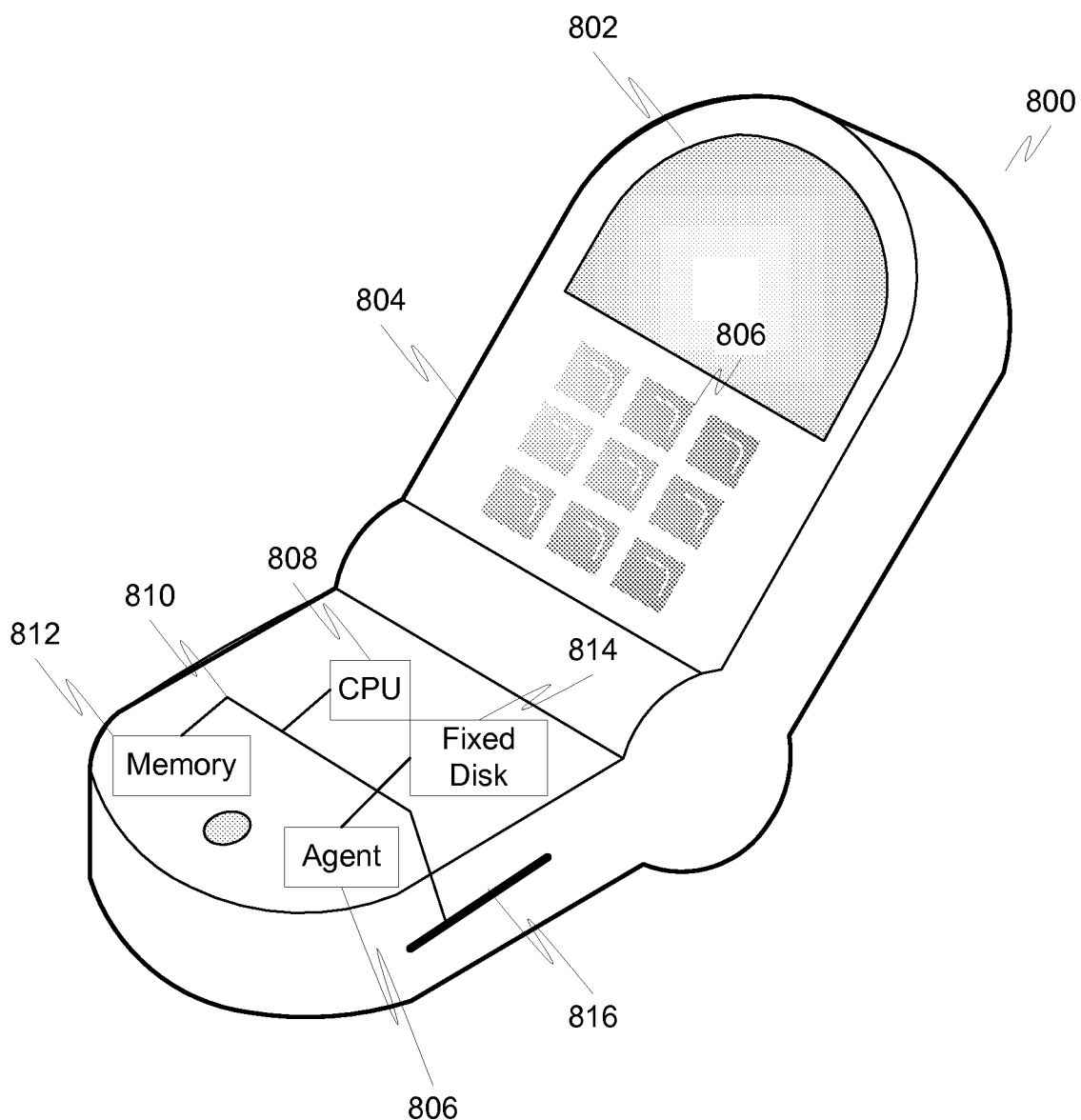
FIG. 8 is a block diagram illustrating a mobile communications device suitable for implementing embodiments of the present invention.

FIGS. 7A and 7B illustrate a computer system 700 suitable for implementing embodiments of the present invention. The centralized reputation service may be located on such a computer system. It is also possible that some end user devices are also implemented on such a computer system, although it is foreseen that some if not all of the end user devices will be implemented on mobile communications devices such as cell phones, smart phones, and personal data assistants, which will be described in more detail below. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 700 includes a monitor 702, a display 704, a housing 706, a disk drive 708, a keyboard 710 and a mouse 712. Disk 714 is a computer-readable medium used to transfer data to and from computer system 700.

FIG. 7B is an example of a block diagram for computer system 700. Attached to system bus 720 are a wide variety of subsystems. Processor(s) 722 (also referred to as central processing units, or CPUs) are coupled to storage devices including memory 724. Memory 724 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 727 is also coupled bi-directionally to CPU 722; it provides additional data storage capacity and may also include any of the computer-readable media described below. Fixed disk 727 may be used to store programs, data and the like and is typically a secondary storage medium (such as a hard disk) that is slower than primary storage. It will be appreciated that the information retained within fixed disk 727, may, in appropriate cases, be incorporated in standard fashion as virtual memory in memory 724. Removable disk 714 may take the form of any of the computer-readable media described below.

CPU 722 is also coupled to a variety of input/output devices such as display 704, keyboard 710, mouse 712 and speakers 730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 722 optionally may be coupled to another computer or telecommunications network using network interface 740. With such a network interface, it is contemplated that the CPU might receive information from the network, or might output information to the network in the course of performing the above-described method steps. Furthermore, method embodiments of the present invention may execute solely upon CPU 722 or may execute over a network such as the Internet in conjunction with a remote CPU that shares a portion of the processing.

Mobile Communications Device Embodiment

FIG. 9 is a block diagram illustrating a mobile communications device suitable for implementing embodiments of the present invention. As described above, the mobile communications device is anticipated to a common end user device utilized in the present invention. FIG. 9 shows one possible physical form of the device, in this case, a cell phone. Of course, the device may have many physical forms. Cell phone 900 includes a screen 902, a housing 904, a keypad 906, a processor 908, and bus 910. Attached to bus 910 are a wide variety of subsystems. Memory 912 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 914 is also coupled bi-directionally to processor 908; it provides additional data storage capacity and may also include any of the computer-readable media described below. Fixed disk 914 may be used to store programs, data and the like and is typically a secondary storage medium (such as a flash memory) that is slower than primary storage. It will be appreciated that the information retained within fixed disk 914, may, in appropriate cases, be incorporated in standard fashion as virtual memory in memory 912. Removable disk 916 may take many forms, including that of any of the computer-readable media described below. Agent 918 is used to implement some or all of the processes described above in the end user device process section. In one example, agent 918 is a software module that is installed on an existing cellular phone in order to provide spam protection. This may be known as an anti-SMS spam product.

Program Storage Device Embodiment

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of handling a communication received on a first mobile cellular device, the method comprising:
  determining a source identification of the communication;
  querying a centralized reputation service with the source identification by a software agent on said mobile cellular device;
  receiving a prediction of the source identification from the centralized reputation service by said software agent on said mobile cellular device, wherein the prediction is an indication of the likelihood that the source identification of the communication is malicious or otherwise untrustworthy, as calculated from a plurality of ratings of the source identification entered by users using a software agent on each of a plurality of mobile cellular devices other than the first mobile cellular device, and wherein said prediction is calculated on-the-fly after said querying and is not calculated before said querying;
  comparing the received prediction to a predefined threshold by said software agent on said mobile cellular device; and
  automatically, and without user intervention, rejecting the communication by said software agent on said first mobile cellular device when the received prediction does not meet or exceed the predefined threshold.

2. The method of claim 1, wherein the source identification is a caller ID.

3. A method of claim 1, wherein said communication is an incoming telephone call, said method further comprising:
  terminating said incoming telephone call by said software agent.

4. A method of claim 1, wherein said communication is a text message, said method further comprising:
  not displaying said text message on said first mobile cellular device by said software agent.

5. A method of claim 1, said method further comprising:
  automatically, and without user intervention, accepting the communication by said software agent on said first mobile cellular device when the received prediction meets or exceeds the predefined threshold, said accepting being entirely transparent to a user of said first mobile cellular device.

6. The method of claim 1, wherein the prediction of the source identification is based on feedback from multiple end user devices.

7. In a centralized reputation computer, a method of managing a centralized reputation service, the method comprising:
  receiving ratings of source identifications of communications from a plurality of end user mobile cellular devices;
  receiving a query from a first end user device for information regarding the reputability of a first source identification;
  using a collaborative filtering algorithm to calculate a prediction for the first source identification from the ratings of source identifications corresponding to the first source identification, wherein the prediction is an indication of the likelihood that the source identification is malicious or otherwise untrustworthy, and wherein said prediction is calculated on-the-fly after said receiving said query and is not calculated before receiving said query;
  sending said information including said prediction regarding the reputability of the first source to the first end user device; and
  comparing said prediction to a predefined threshold by a software agent on said first end user device.

8. The method of claim 7, wherein the information includes a recommendation as to whether to allow or reject a communication from the first source identification.

9. The method of claim 7, wherein the information includes an average of the one or more ratings relating to the first source identification.

10. The method of claim 7, wherein the first source identification is a caller ID.

11. A method of claim 7, said method further comprising:
  automatically, and without intervention from a user of said first end-user device, rejecting a communication by said software agent on said first end-user device when said prediction does not meet or exceed said predefined threshold.

12. A method of claim 7, said method further comprising:
  automatically, and without intervention from a user of said first end-user device, accepting a communication by said software agent on said first end-user device when said prediction meets or exceeds said predefined threshold, said accepting being entirely transparent to said user of said first end-user device.

13. A mobile cellular device reputation system comprising:
  a plurality of end-user mobile cellular devices, wherein each of the plurality of end-user mobile cellular devices includes a software agent configured to interface with the control module of the centralized reputation server computer;
  a rating information database including ratings associated with a communication source, said ratings originating from said mobile cellular devices;
  a prediction information database including a prediction of reputability for said communication source based on said ratings, wherein said prediction is calculated on-the-fly after said receiving a query and is not calculated before receiving said query; and
  a centralized reputation server computer having a control module and in communication with said end-user mobile cellular devices, wherein said control module facilitates receiving said ratings from said mobile cellular devices and delivering said prediction of reputability to one of said mobile cellular devices, and wherein said software agent of said one mobile cellular device being further configured to automatically, without user intervention, reject a communication from said communication source when said delivered prediction does not meet or exceed a predefined threshold.

14. A method of handling a communication received on a first mobile cellular device, the method comprising:
  determining a source identification of the communication;
  scanning a locally stored banned list for the source identification of the communication;
  rejecting the communication if the source identification is on the locally stored banned list; and
    when it is determined that the source identification is not on the locally stored banned list:
  querying a centralized reputation service with the source identification;
  receiving a prediction of the source identification from the centralized reputation service, wherein the prediction is an indication of the likelihood that the source identification of the communication is malicious or otherwise untrustworthy, as calculated by a collaborative filtering algorithm from a plurality of ratings of the source identification by users on a plurality of mobile cellular devices other than the first mobile cellular device, and wherein said prediction is calculated on-the-fly after said querying and is not calculated before said querying;

comparing the received prediction to a predefined threshold by a software agent on said first mobile cellular device; and automatically, and without user intervention, rejecting the communication when the received prediction does not meet or exceed the predefined threshold.

* * * * *